United States Patent [19]

Desserre et al.

[11] 4,432,028
[45] Feb. 14, 1984

[54] SHIELDED MAGNETORESISTANCE TRANSDUCER HIGH DATA DENSITY APPLICATIONS

[75] Inventors: Jacques Desserre, Orcemont; Michel Helle, Marco, both of France

[73] Assignee: Cii Honeywell Bull, Paris, France

[21] Appl. No.: 314,975

[22] Filed: Oct. 26, 1981

[30] Foreign Application Priority Data

Nov. 27, 1980 [FR] France .............................. 80 25198

[51] Int. Cl.$^3$ ................................................ G11B 5/30
[52] U.S. Cl. ........................................ 360/113; 324/252
[58] Field of Search ............... 324/249, 252; 360/110, 360/113, 128

[56] References Cited

U.S. PATENT DOCUMENTS

| 3,222,754 | 12/1965 | Homan | 29/155.5 |
| 3,710,036 | 1/1973 | Kohtani | 360/128 |
| 4,071,868 | 1/1978 | Kaminacki et al. | 360/113 |

FOREIGN PATENT DOCUMENTS

| 1114335 | 9/1961 | Fed. Rep. of Germany . | |
| 2218611 | 9/1974 | France . | |
| 56-165924 | 12/1981 | Japan | 360/113 |

OTHER PUBLICATIONS

IBM Technical Disclosure Bulletin, vol. 2, No. 2, Aug. 1959, p. 35, Increased Density Magnetic Recording, L. F. Shew.

IBM Technical Disclosure Bulletin, vol. 12, No. 7, Dec. 1969, p. 958, Shielding Method, Brede et al.

Primary Examiner—George G. Stellar
Attorney, Agent, or Firm—Kerkam, Stowell, Kondracki, & Clarke

[57] ABSTRACT

A magnetoresistance transducer for reading data from the tracks of a record carrier comprises at least one magnetoresistance perpendicular to the direction of travel of the data of each track P. First and second plane magnetic means are situated at either side of the magnetoresistance in such manner as to intercept and deflect the magnetic field lines transmitted by the immediate surroundings of the track P and by the data items adjacent to the data item which has the magnetoresistance positioned opposite to it.

13 Claims, 14 Drawing Figures

SHIELDED MAGNETORESISTANCE TRANSDUCER HIGH DATA DENSITY APPLICATIONS

BACKGROUND OF THE INVENTION

1. Field of the Invention

The present invention relates to magnetoresistance transducers and is applicable in particular to the reading of data on multitrack magnetic record carriers such as rigid or flexible magnetic discs and magnetic tapes in which the data density is very high.

2. Description of the Prior Art

It is known that magnetic discs carry data on circular concentric recording tracks which have a radial width no greater than a few hundredths of a millimeter and commonly cover the greater part of both surfaces of the disc. Magnetic tapes, on the other hand, commonly carry data on tracks parallel to the tape length.

As a rule, a sequence of magnetic data recorded on the tracks of a disc or tape appears in the form of a succession of small magnetic areas referred to as "elementary areas" which are distributed throughout the length of the track and have magnetic inductions of identical modulus and opposed direction.

Longitudinal or linear density denotes the number of data per unit of length measured along the circumference of a track in the case of a magnetic disc, or along the tape length in the case of a magnetic tape. Radial data density (in the case of a magnetic disc) denotes the number of recording tracks per unit of length measured along the diameter of the disc.

The present trend in the development of magnetic discs is to increase the linear density as well as the radial density of the data.

The means which make it possible either to record data on discs or tapes, or to read recorded data therefrom or finally to perform one or the other of these two functions are referred to as "magnetic transduction devices", or more singly magnetic transducers. As a rule, one or more transducers are associated with a given record carrier which is driven so as to travel past and in front of the transducer.

In existing current practice, increasingly frequent use is made of transducers comprising one or more magnetoresistances, which are referred to under the more specific title of "magnetoresistance transducers" for reading data on discs or tapes. Magnetoresistance transducers are used in particular to read magnetic discs of very high linear and/or radial data density.

It will be recalled that a magnetoresistance is an element formed by magnetic material of which the electrical resistance R varies as a function of the magnetic field to which this element is exposed.

In present practice, these magnetoresistances are electrical resistances having the form of thin layers or films of very small thickness of which the length very greatly exceeds the width. The term "thin layer" as used herein denotes a layer having a thickness in the range of a few hundred Angstroms to a few microns. These magnetoresistances are frequently deposited on a substrate of electrically insulating material by well known deposition techniques.

Consider such a measuring magnetoresistance R connected to the terminals of a current generator which delivers a current having the intensity I flowing in the direction of its length. It is assumed that it appertains to a magnetoresistance transducer associated with a magnetic record carrier and that the transducer is situated at a distance from the carrier which is very small or even zero.

When each of the elementary magnetic areas passes before the transducer, the magnetic leak current $H_f$ generated by these areas close to the surface of the carrier causes a variation $\Delta R$ of its resistance, giving a variation $\Delta V = I \times \Delta R$ at its terminals, which yields: $\Delta V/V = \Delta R/R$, $\Delta R/R$ being referred to as the "magnetoresistance coefficient". This coefficient is normally of the order of 2%.

The electrical signal collected at the terminals of a magnetoresistance is solely a function of the value of the magnetic field $H_f$ to which this magnetoresistance is exposed. For this reason, it has an amplitude unaffected by the speed of the record carrier in front of which is situated the magnetoresistance.

It will be recalled that "initial magnetic permeability of a magnetic material" denotes the ratio (B/H) between the magnetic field induction and the magnetic field itself when B and H are close to zero, and this on the first magnetisation curve. The first magnetosation curve is the curve showing the variation of B as a function of the field H when the magnetoresistance is exposed to a magnetic magnetisation field, and this starting from an initial magnetic state of the material defined by B and H being close to zero. In other words, the initial magnetic permeability of the material is equal to the slope of the first magnetisation curve close to the point at which B=0 and H=0.

It will also be recalled on the other hand that a magnetically anisotropic material positioned in a plane, having a thickness much smaller than its length and also its width, has in said plane two preferential directions of magnetization, commonly perpendicular to each other. One of these is referred to the "direction of easy magnetization". The other is referred to as the "direction of difficult magnetization". The initial permeability of the material in the direction of difficult magnetization greatly exceeds the initial permeability of the material in the direction of easy magnetization. The term "anisotropy field" $H_k$ is used to denote the total value of the magnetic field H which acts on any point of the material in its direction of difficult magnetization and from which saturation is obtained at this point in this direction.

The magnetoresistance utilized are commonly produced from a magnetically anisotropic material, for example an iron-nickel alloy (18% or iron, 82% of nickel). Their axis of easy magnetization is parallel to the direction of the current I and to their length, whereas their axis of difficult magnetization extends perpendicular to the former. The position of the one (of the) magnetoresistance(s) of a magnetoresistance transducer with respect to the record carrier associated with it (then), is such that it is exposed to the component of leakage field of the elementary areas which is parallel to its or their axis or axes of difficult magnetization, which is itself perpendicular to the surface of the carrier. When a magnetoresistance is not exposed to any magnetic field, it is said that it is inactive. In this case, the magnetization, that is to say the magnetic induction within the magnetoresistance, has the same direction as the axis of easy magnetization.

It can be shown that the efficiency or sensitivity of a magnetoresistance formed from an anisotropic magnetic material may be increased, that is to say the voltage of its output signal as a function of the magnetic field applied to it may be increased, by exposing the same to a magnetic polarizing field $H_{pol}$ parallel to its axis of difficult magnetization, as described in the French Patent No. 2165206 filed on Dec. 22, 1971 by Compagnie Internationale pour l'Informatique, under the title "Improved magnetoresistances and electromagnetic transducer incorporating same".

The value of the polarizing field $H_{pol}$ is selected in such a manner that the magnetization in the magnetoresistance is turned through an angle $\theta$ preferable close to 45°. In this case, it can be shown that the efficiency of the magnetoresistance is a maximum, that is to say, that a given variation $\Delta H$ of the magnetic field to which it is exposed (other than the field $H_{pol}$) corresponds to a maximum variation of its resistance and hence of its output voltage. Moreover, it is possible to determine the direction of the magnetic field (or else the direction of the magnetic flux to which the magnetoresistance is exposed), which is not the case unless the magnetoresistance is polarized.

In existing practice, magnetoresistance transducers often comprise two parallel magnetoresistance elements (that is to say, their lengths and widths are parallel) separated by a distance of the order of a tenth or a micron. The distance separating them is at all events substantially or very much smaller than the length of the elementary magnetic carrier, so that these magnetoresistance are exposed to the same component of the leakage field, namely that which is produced by the area before which they are positioned.

The two magnetoresistance elements are each polarized to a value of the order of 45° (in absolute value), their magnetizations then being at 90° to each other as explained in the French Patent No. 2248566 filed by Compagnie Internationale pour l'Informatique on the Oct. 23, 1973 under the title "Improved electromagnetic transducer". The output signal $\Delta v_1$ of the first magnetoresistance element is transmitted to a first input terminal of a differential amplifier, whereas the output signal $\Delta v_2$ supplied by the second magnetoresistance element is transmitted to a second input terminal of the same differential amplifier. Since $\Delta v_1$ is substantially equal to $-\Delta v_2$, a signal proportional to $2 \times \Delta v_1$ is collected at the output terminal of the differential amplifier.

It is equally demonstrable that the utilization of a differential amplifier renders it possible to establish a ratio between the useful signal, that is to say the signal proportional to $v_1$, and the noise signal, that is to say the signal/noise ratio S/B. As a matter of fact, it is demonstrable that if $B_1$ is the noise signal transmitted to the first input terminal of the differential amplifier, and if $B_2$ is the noise signal transmitted to the second input terminal of the same amplifier, $B_1$ and $B_2$ have the same sign. As a result, a noise signal B proportional to $B_1 - B_2$, that is to say a very weak noise signal, is collected at the output terminal of the differential amplifier. It will be recalled that the noise signal is caused in particular by thermal disturbance in the magnetoresistance, and equally by all the magnetic fields other than the magnetic leakage field generated by the area opposite to which are positioned the two magnetoresistances.

As described in U.S. patent applications Ser. Nos. 242,923 and 242,924, filed on Mar. 12, 1981 in the name of Jean-Pierre Lazzari et al and assigned to Compagnie Internationale pour L'Informatique Cii-Honeywell Bull, there is present at either side of a given track P of a magnetic disc (an identical reasoning may equally be applied for magnetic tapes) having a "circular symmetry axis" $Ax_p$, a zone of a width substantially equal to $\delta$ which contains magnetic data having the memory of the earlier state of the carrier, that is the state the carrier had, for example, before the track P had been recorded by means of a data write transducer associated with the magnetic disc. The value $\delta$ is the maximum limit of the accuracy of the system for positioning the write transducer opposite the magnetic disc, beyond which it is impossible to go.

By definition, the expression "immediate environment of the track P" denotes the total formed by the data of the zone of width $\delta$ and by the data of the tracks adjacent to the P' and P".

Consider for the moment a magnetoresistance transducer comprising two magnetoresistance elements positioned, for example, facing a magnetic disc.

The two magnetoresistances are then exposed, not only to the component normal to the magnetic disc of the magnetic leakage field of the magnetic area opposite which they are positioned, but equally—on the one hand to the resultant $H_{envi}$ of the magnetic leakage fields generated by the immediate environment of the track P"—on the other hand to the resultant $H_{iv}$ of the magnetic leakage fields generated by the magnetic areas situated on the track P at either side of the area opposite which the two magnetoresistances are positioned.

These two resultants $H_{envi}$ and $H_{iv}$ are the cause of a noise signal having the same frequency as the signal resulting from reading the magnetic leakage fields of the data of the different areas of a given track.

It is demonstrable that when the radial data density increases, the noise signal caused by the resultant $H_{envi}$ equally increases.

Similarly, when the linear data density increases, it is shown that the noise signal caused by the resultant $H_{iv}$ increases. It then becomes more difficult to detect any useful signal corresponding to a given data of a track of the carrier by contrast to the noise signals.

In existing practice, magnetic screening means formed by a set of thin laminations of preferably anisotropic magnetic material, which are coupled together and separated by non-magnetic layers, are placed at either side of the magnetoresistances so as to cancel the action of the resultant $H_{iv}$ on their output signal. The plane of each of the laminations is perpendicular to the record carrier and to the direction of travel of the tracks. The height of these screening means (their dimension measured perpendicular to the record carrier) greatly exceeds that of the magnetoresistant elements of the transducer. In the case in which the magnetic material of the screening means is anisotropic, the axis of difficult magnetisation of these means is oriented perpendicular to the magnetic carrier, so that the magnetic field lines generated by the areas which on the same track surround the magnetic area opposite to the magnetoresistance are not intercepted by the two magnetoresistance elements.

When the linear data density reaches a value of the order of 5000 inversion of magnetic flux per centimeter (which corresponds to 5000 changes in direction of the magnetic induction), this means that the length of each elementary magnetic area is of the order of 2 to 2.5 microns, the following factors intervene:

(1) The resultant $H_{iv}$ becomes substantial (of the order of the component $H_f$ of the magnetic leakage field):

(2) The distance between the magnetic screening means and the magnetoresistance elements becomes so small (of the order of one micron) that the magnetic coupling between the magnetoresistance elements and the screening means becomes substantial.

The consequence of the two actions cited above is that a sizeable mutual induction occurs between the magnetic screening means and the magnetoresistance elements which causes appreciable modification of the magnetization in the latter (magnetization greater than the linear data density). This sizeable mutual induction results in an interference signal which may destroy the data which it is wished to read, that is to say which may wholly neutralize the effect of the component $H_f$ of the magnetic leakage field on the two magnetoresistances.

SUMMARY OF THE INVENTION

The present invention makes it possible on the one hand to substantially eliminate the disadvantages cited above, and on the other hand to cancel the actions of the resultant $H_{envi}$ caused by the immediate environment of the track P on the signal supplied by the magnetoresistances, by disposing at either side of the latter plane magnetic means parallel to the carrier (of smaller height than that of the magnetoresistances), to channel or deflect practically all the magnetic field lines forming the resultants $H_{iv}$ and $H_{envi}$. The magnetic coupling between these plane magnetic means and the magnetoresistances is extremely weak.

The magnetoresistance transducer in accordance with the invention consequently makes it possible to read the data on a given track P, elementary area by elementary area, without the magnetic leakage field of a given area being disturbed by the resultant of the magnetic leakage fields of the adjacent areas situated on the same track and by the resultant of the magnetic leakage fields generated by the immediate surroundings of the track P.

In accordance with the invention, a magnetoresistance transducer for reading the data of a carrier contained within a plurality of tracks, comprises at least one magnetoresistance ($MRI_1$ and $MRI_2$), at right angles to the direction of travel of the data of any track P, and first and second plane magnetic means ($MCH_{envi1}$—$MCH_{envi2}$, $MCH_{iv1}$, $MCH_{iv2}$) parallel to the carrier, which are situated respectively at either side of the magnetoresistance, so that when the magnetoresistance is situated opposite a given data item of the track P, the first means are positioned opposite the immediate magnetic surroundings of the track P and the second means opposite the data items of the track P situated at either side of the data item present opposite the magnetoresistance.

BRIEF DESCRIPTION OF THE DRAWINGS

Other features and advantages of the present invention will appear from the following description given by way of a non-limiting example and with reference and to the accompanying drawings, in which:

FIG. 1 illustrates the principle of construction and operation of a magnetoresistance transducer in accordance with the prior art comprising two magnetoresistance elements of anisotropic magnetic material, and comprises:

FIG. 7b is a cross-sectional view taken at right angles to the view of FIG. 7a;

DESCRIPTION OF THE PREFERRED EMBODIMENTS

In order to gain a clearer grasp of the principles of construction and operation of the magnetoresistance transducer in accordance with the invention, it may be helpful, with the aid of FIGS. 1a to 1d, 2, 3, 4 and 5, to briefly review construction and operation magnetoresistance transducers in accordance with the prior art.

Figure 1A:
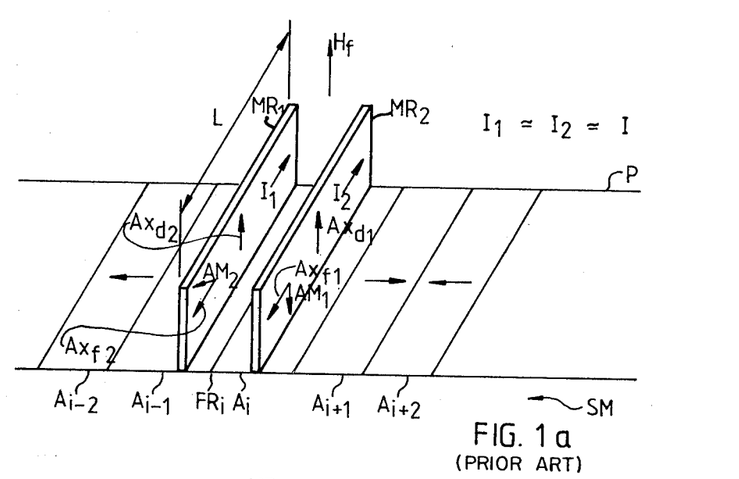
FIG. 1a which is a three-quarter perspective view showing the two magnetoresistance elements positioned opposite a track of a magnetic record carrier such as a magnetic disc.

Referring first to FIGS. 1a to 1d, consider a prior art magnetoresistance transducer TMRA comprising two magnetoresistances $MR_1$ and $MR_2$. In FIG. 1a, the two magnetoresistances MR$_1$ and MR$_2$ are shown arranged opposite the track P of a magnetic record carrier SM such as a magnetic disc. The length L of the two magnetoresistances (these are both assumed to have identical dimensions) is of the order of the magnitude of the width L$_p$ of the track P. Their height h measured perpendicular to the carrier SM being, for example, of the order of 5 to 10 microns. The length L greatly exceeds the thickness 1. At both their extremities, the magnetoresistances MR$_1$ and MR$_2$ have connecting conductors (not shown, in order to simplify FIGS. 1a and 1b) which make it possible to connect these to the electronic circuits for the data of the carrier SM.

The axes Ax$_{f1}$ and Ax$_{f2}$ of easy magnetization of the magnetoresistances MR$_1$ and MR$_2$ are parallel to each other and to the length of the magnetoresistances. Similarly, the axes of difficult magnetization Ax$_{d1}$ and Ax$_{d2}$ are mutually parallel and perpendicular to the greater dimension of the magnetoresistance as well as to the carrier SM.

Figure 1B:
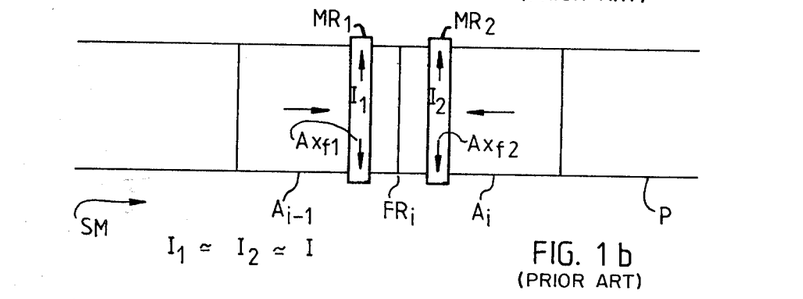
FIG. 1b which is a view from above showing the two magnetoresistance elements positioned opposite two adjacent magnetic areas of the recording track of a magnetic disc associated with a magnetoresistance transducer.
Figure 1C:
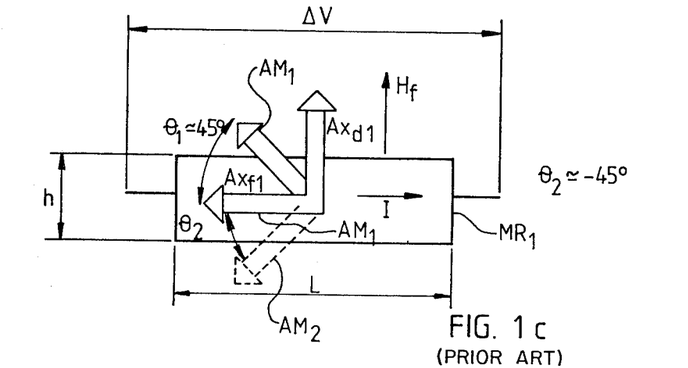
FIG. 1c which is an explanatory diagram relating to one of the magnetoresistance elements shown in FIGS. 1a and 1b.

The magnetoresistances MR$_1$ and MR$_2$ are supplied with a current I (the intensity of this current is the same in both magnetoresistances) which flows in the direction shown in FIGS. 1a and 1c, for example, that is to say parallel to the axes of easy magnetization Ax$_{f1}$ and Ax$_{f2}$. This current I is supplied by a current generator which is not shown in order to simplify these figures.

The magnetoresistances MR$_1$ and MR$_2$ are exposed to the same component H$_f$ of the magnetic leakage field of the elementary magnetic areas of the carrier (some of these areas, A$_{i-2}$, A$_{i-1}$, A$_i$, A$_{i+1}$, A$_{i+2}$, are illustrated in FIG. 1a), which component is at right angles to the record carrier SM and consequently parallel to the axes of difficult magnetization Ax$_{d1}$ and Ax$_{d2}$ of the two magnetoresistances.

Reading of a data item by the two magnetoresistances MR$_1$ and MR$_2$ occurs when these are positioned opposite two elementary magnetic areas A$_{i-1}$ and A$_i$ in the manner shown in FIG. 1b. The two magnetoresistances are then positioned at either side of the border FR$_i$ between the two magnetic areas A$_{i-1}$ and A$_i$.

Figure 2:
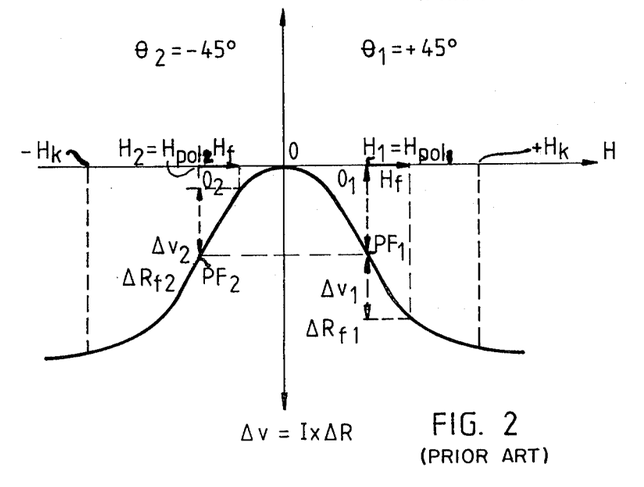
FIG. 2 graphically conveys a clearer grasp of the principles of the polarization of each of the two magnetoresistances, and of the operation of the magnetoresistance transducer in accordance with the prior art.

FIG. 2 which shows the curve of the variation ΔR of the resistance R of the two magnetoresistances MR$_1$ and MR$_2$ as a function of the total magnetic field H applied at each point of the two magnetoresistances (assuming that each point of the magnetoresistances is exposed to the same total field H), makes it possible to gain a clearer grasp of the operation of the prior art magnetoresistance transducer TMRA. It is evident that the two magnetoresistances are assumed to have the same characteristics (same size, same material) in such a manner as to have strictly identical variation curves ΔR as a function of the total field H. More specifically, in FIG. 2, the part of the curve corresponding to the positive values of the total field H corresponds to the variation curve of the magnetoresistance MR$_1$, whereas the part of the graph illustrated in FIG. 2 corresponds to the variation curve of the magnetoresistance MR$_2$.

It is apparent that for a value of the total field H applied to each point of the magnetoresistance, which is equal to the anistropy field H$_k$ of the material forming the magnetoresistance, the latter being saturated in its direction of difficult magnetization, the resistance R no longer varies. A maximum sensitivity is imparted to each of the two magnetoresistances MR$_1$ and MR$_2$ by shifting the ordinate axis of FIG. 2 from the origin 0 to the origin 0$_1$ for the magnetoresistance MR$_1$, and from the origin 0 to the origin 0$_2$ for the magnetoresistance MR$_2$, by exposing each of these magnetoresistances to a polarizing field H$_{pol1}$ in the case of magnetoresistance MR$_1$ and H$_{pol2}$ in the case of the magnetoresistance MR$_2$, with H$_{pol1}$ = −H$_{pol2}$.

These polarizing fields are parallel to the axes of difficult magnetization Ax$_{d1}$ and Ax$_{d2}$ of the two magnetoresistances and thus parallel to the component H$_f$ of the magnetic leakage field of the data of the carrier SM at right angles to the carrier SM. They are normal to the plane of the carrier SM and to the direction of travel of the data.

It is then shown that in the case in which the two magnetoresistances are exposed to the two magnetic polarizing fields H$_{pol1}$ and H$_{pol2}$, the variation ΔR of their resistances is relatively substantial and may even be a maximum for a particular value of these fields to which corresponds a rotation of the magnetizations AM$_1$ and AM$_2$ within each magnetoresistance, equal respectively to an angle θ$_1$ close to +45° for the magnetoresistance MR$_1$ and to θ$_2$ close to −45° for the magnetoresistance MR$_2$ (see also FIG. 1c). In other words, the ratio ΔR/ΔH is a maximum for a given ΔH, this ratio being a function of the angle of polarization. As a result, a comparatively substantial variation ΔR of their resistances and consequently of ΔV=I×ΔR (at a constant value of I) thus corresponds to a comparatively small modification ΔH of the magnetic field applied to the magnetoresistances.

Two working points PF$_1$ and PF$_2$ respectively, of which the abscissae 00$_1$ and 00$_2$ are equal respectively to H$_{pol1}$ and H$_{pol2}$ are thus defined for the two magnetoresistances. If the magnetoresistance MR$_1$ is exposed to the component H$_f$ of the magnetic leakage field of the data of the carrier, its resistance variation is ΔR$_{f1}$ and the voltage collected across its terminals is then Δv$_1$=I×ΔR$_{f1}$. It may equally be demonstrated that the resistance variation of the magnetoresistance MR$_2$, under identical conditions, is equal to ΔR$_{f2}$ and has the opposite sign to that of ΔR$_{f1}$, and that the voltage collected across its terminals is Δv$_2$=I×ΔR$_{f2}$=−Δv$_1$, or |Δv$_1$| = |Δv$_2$|. It is apparent that, in existing practice, the current I$_1$ flowing through the magnetoresistance MR$_1$ differs slightly from the current I$_2$ flowing in the magnetoresistance MR$_2$. It will be assumed however that |Δv$_1$| = |Δv$_2$| stil applies.

It is demonstrable that around each of the working points PF$_1$ and PF$_2$, the resistance variation is practically a linear function of this field, that is to say that the ratio ΔR/ΔH is substantially constant.

It is apparent that the angle subtended by the magnetizations AM$_1$ and AM$_2$ is equal to (θ$_1$−θ$_2$)=90°.

In current practice, the two voltages Δv$_1$ and Δv$_2$ are transmitted respectively, to the two input terminals of a differential amplifier; a signal proportional to (|Δv$_1$|+|Δv$_2$|) differing slightly from 2×|Δv$_1$| and 2×|Δv$_2$| being collected at the output of the said amplifier.

Figure 1D:
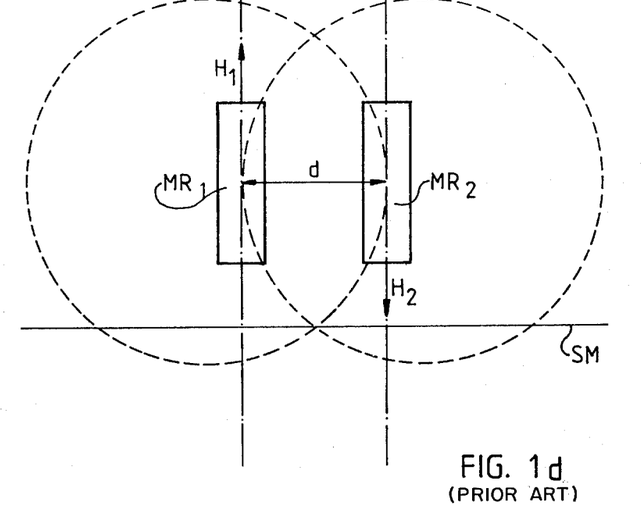
FIG. 1d diagrammatically illustrates an example of autopolarization of the magnetoresistances, the first being polarized by the magnetic field generated by passage of the current through the second and vice versa.

As is apparent from FIG. 1d, the two magnetoresistances MR$_1$ and MR$_2$ are normally polarized in the following manner: the magnetoresistance MR$_1$ is polarized by the field H$_2$ generated by passage of the current I$_2$ through the magnetoresistance MR$_2$, whereas the magnetoresistance MR$_1$ is polarized by the field H$_1$ generated by passage of the current I$_1$ through the magnetoresistance MR$_1$. (It will be recalled that I$_1$ is very often substantially equal to I$_2$ and substantially equal to an identical value I). It is plain moreover that H$_1$ is substantially equal to −H$_2$.

Figure 3:
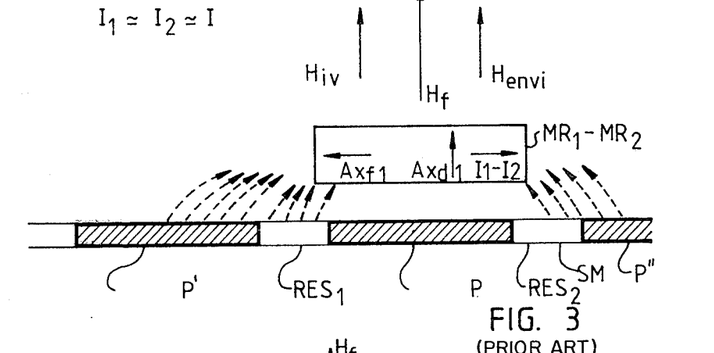
FIG. 3, is a view in cross-section taken in a plane normal to the recording carrier and to the direction of travel of the data, shows one of two magnetoresistances in accordance with the prior art situated in alignment with a track P of the disc, and makes it possible to grasp the manner in which this magnetoresistance is exposed to the resultant of the magnetic leakage fields generated by the immediate magnetic surroundings of the track P.

Considering FIG. 3, the magnetoresistance $MR_1$ is disposed opposite the track P, the magnetoresistance being assumed to be perfectly centered above the track P, which means that the axis of symmetry of the magnetoresistance and the axis of circular symmetry of the track P, which are normal to the carrier SM, are merged. (This applies equally in respect of the magnetoresistance $MR_2$).

When the radial density of the data becomes very large, the magnetoresistance $MR_1$ (an identical reasoning may be applied for the magnetoresistance $MR_2$) is exposed to the resultant $H_{envi}$ of the magnetic leakage fields generated by the two tracks P' and P'' adjacent to the track P and by the two data residues $RES_1$ and $RES_2$ which indicate the previous condition of the carrier, meaning the state this carrier had prior to the recording of the tracks P, P', P'' etc.

For high radial density values, this resultant $H_{envi}$ generates a noise signal across the terminals of the magnetoresistance, which is not negligible compared to the signal generated by the component $H_f$ of the leakage field of the two data items opposite whose boundary $FR_i$ is situated the magnetoresistance $MR_1$.

Figure 4:
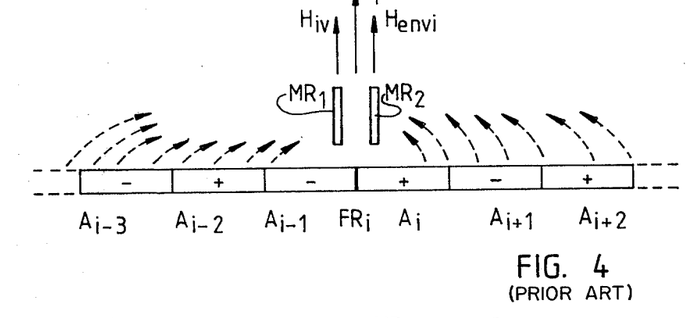
FIG. 4, is a view in cross-section showing a portion of a track P situated in a plane perpendicular to the record carrier and parallel to the direction of travel of the data, makes it possible to grasp the manner in which the two magnetoresistances are exposed to the resultant of the magnetic leakage fields generated by the elementary magnetic areas situated on the track P and adjacent to the elementary magnetic area opposite to the two magnetoresistances.

Considering FIG. 4, the two magnetoresistances $MR_1$ and $MR_2$ are positioned opposite the boundary $FR_i$ of the two magnetic areas $A_{i-1}$ and $A_i$ of the track P. It is apparent that these two magnetoresistances are exposed to the resultant $H_{iv}$ of the magnetic leakage fields generated by the magnetic areas of two areas $A_{i-1}$ and $A_i$ (the areas $A_{i-3}$, $A_{i-2}$, $A_{i+1}$, $A_{i+2}$), that is to say the magnetic leakage fields generated respectively by the pairs of adjacent magnetic areas of opposite induction, for example the pairs $A_{i-1} - A_{i-2}$, $A_{i-2} - A_{i-3}$, $A_i - A_{i+1}$, $A_{i+2}$ etc.

The resultant $H_{iv}$ becomes non-negligible as compared to the component $H_f$ of the magnetic leakage field generated by the two areas $A_i - A_{il}$ when the linear data density of the track P becomes extremely large.

Figure 5:
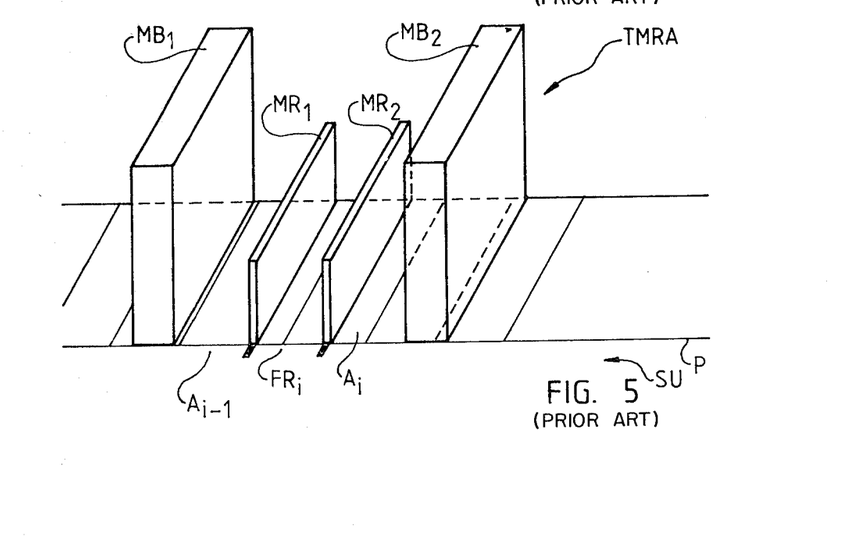
FIG. 5 is a three-quarter perspective view showing a prior art magnetoresistance transducer equipped with magnetic screening means arranged at either side of the two magnetoresistances along a direction parallel to the direction of travel of the data.
Figure 6:
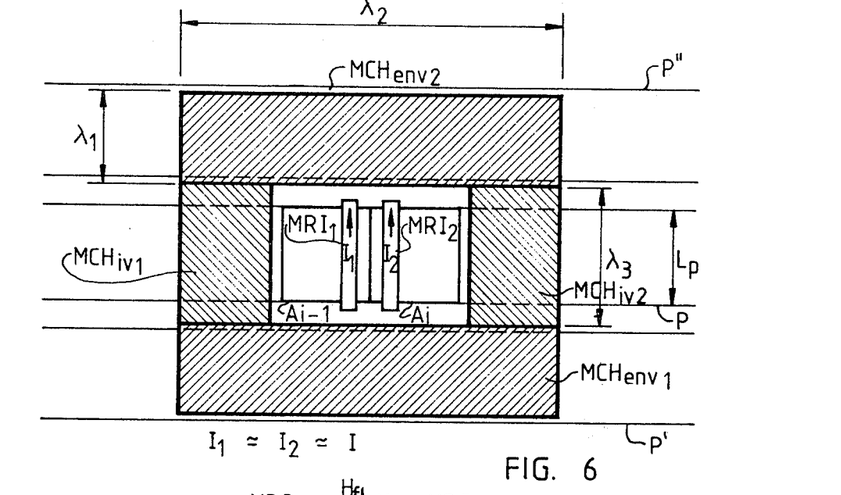
FIG. 6 is a view from above of one embodiment of a magnetoresistance transducer in accordance with the present invention, the transducer being shown opposite a track P.

In existing practice, for the purpose of eliminating the actions of the resultant $H_{iv}$ on the magnetoresistance, that is to say in order to reduce the noise interference signal collected at the output terminals of the two magnetoresistances due to the resistance variation caused by this resultant $H_{iv}$, magnetic screening means $MB_1$ and $MB_2$ are placed at either side of the two magnetoresistances $MR_1$ and $MR_2$, as is apparent from FIG. 5. These magnetic screening means are preferably formed by anisotropic magnetic material. They have an axis of easy magnetization $AF_1$ and $AF_2$ respectively, and an axis of difficult magnetization $AD_1$ and $Ad_2$ respectively. These axes of easy and difficult magnetization are parallel, respectively, to the axes of easy and difficult magnetization of the two magnetoresistances. These screening means make it possible to channel, deflect or intercept the magnetic leakage field lines generated by the adjacent magnetic areas of opposite induction to the track P which are present at either side of the two areas $A_{i-1}$ and $A_i$ so that practically none of these field lines penetrate into the two magnetoresistances $MR_1$ and $MR_2$.

Nevertheless, when the linear data density becomes extremely large, the distance between the magnetic screening means $MB_1$ and $MB_2$ and the magnetoresistances $MR_1$ and $MR_2$ becomes very small. Because of this, the magnetic coupling between the means $MB_1$ and the magnetoresistance $MR_1$ the magnetic coupling between the means $MB_2$ and the magnetoresistance $MR_2$, and the magnetic coupling between the means $MB_1$ and the means $MB_2$, become extremely large.

Moreover, the resultant $H_{iv}$ intercepted by the magnetic screening means $MB_1$ and $MB_2$ becomes much greater, which then increases the coupling between $MB_1$ and $MR_1$, between $MB_2$ and $MR_2$, and between $MB_1$ and $MB_2$. As stated above, mutual inductance phenomena then intervene between the magnetic screening means $MB_1$, $MB_2$ and the magnetoresistances $MR_1$ and $MR_2$. They modify the magnetic state of the magnetoresistance (intensity of magnetization, value of the angle of polarization). As a result, the detection of the component $H_f$ of the magnetic leakage field of the two areas $A_{i-1}$ and $A_1$ is considerably disturbed, which may extend as far as total destruction of useful data, that is to say of the two voltages $v_1$ and $v_2$ resulting from the resistance variation of the two magnetoresistances exposed to this component $H_f$.

As a result, it is no longer possible to utilize screening means such as $MB_1$ and $MB_2$ of which the height measured perpendicular to the carrier SM greatly exceeds that of the magnetoresistances.

The principle of the invention illustrated by FIGS. 6, 7a and 7b and 8, consists in placing plane magnetic means at either side of the magnetoresistances, on the one hand in a direction parallel to the direction of travel of the data and on the other hand in a direction perpendicular to the direction of travel of the data (that is to say at either side of the magnetoresistances as seen in the direction of their length), for the purpose of intercepting and deflecting the magnetic field transmitted on the one hand by the pairs of magnetic areas adjacent to those of the track P opposite the boundary of which is situated the two magnetoresistances, and on the other hand by the immediate surroundings of the track P.

Consider FIGS. 6, 7a, 7b and 8 which illustrate a preferred embodiment $TMRI_1$, which is illustrated opposite a track P of the carrier SM, this transducer comprises two magnetoresistances $MRI_1$ and $MRI_2$ which are parallel to each other. A first plane magnetic means $MCH_{env1}$ and $MCH_{env2}$ are situated at either side of the magnetoresistances, so that they are positioned opposite the immediate magnetic surroundings of the track P of the carrier SM when the two magnetoresistances are disposed opposite the track P. A second plane magnetic means $MCH_{iv1}$ and $MCH_{iv2}$ are situated at either side of the magnetoresistances $MRI_1$ and $MRI_2$ so that they are placed opposite the magnetic areas adjacent to the areas $A_{i-1}$ and A of the track P when the two magnetoresistances $MRI_1$ and $MRI_2$ are placed opposite the boundary $FR_i$ of the two areas $A_{i-1}$ and $A_i$.

The two magnetoresistances $MRI_1$ and $MRI_2$ are of a type strictly identical to that of the magnetoresistances $MR_1$ and $MR_2$ of the prior art transducer TMRA. They are of anisotropic magnetic material and their lengths are equal to or greater than the width Lp of the track P of the carrier SM. Their axes of easy and difficult magnetization are arranged in identical manner to that specified in FIGS. 1a, 1b, 1c and 3.

The first plane magnetic means $MCH_{env1}$ and $MCH_{env2}$ are identical. They are preferably produced from an anisotropic magnetic material. They may comprise a plurality of thin mutually parallel magnetic laminations separated from each other by thin non-magnetic laminations. The assembly of the magnetic and non-magnetic laminations is parallel to the record carrier. These have not been shown in end view in order to simplify FIGS. 6, 7a, 7b, 8 and 9.

Their width $\lambda_1$ measured along a direction parallel to the length of the magnetoresistances is substantially of the order of magnitude of the width Lp of the tracks P', P" and P. The length $\lambda_2$ of these first plane magnetic means measured along a direction parallel to the direction of travel of the data is at least four times greater than the length of an elementary magnetic area. The thickness $e_1$ of these first magnetic means is very small and at all events substantially smaller than the height h of the magnetoresistances measured at right angles to the carrier SM. This thickness $e_1$ is much smaller than the two other dimensions $\lambda_1$ and $\lambda_2$ of these same first plane magnetic means.

The second plane magnetic means $MCH_{iv1}$ and $MCH_{iv2}$ have a width $\lambda_3$ which, measured in the direction of the length of the magnetoresistances, is a little smaller than or equal to the width Lp of the tracks of the magnetic carrier SM. The length $\lambda_4$ (see FIG. 7a) of these same means measured along a direction parallel to the direction of travel of the data is of the order of or appreciably greater than the length of each elementary area of the track P. The thickness $e_2$ of the same second plane magnetic means is much smaller than the height h of the magnetoresistances and equally much smaller than the dimensions $\lambda_3$ and $\lambda_4$. The thickness $e_2$ of the second plane magnetic means is preferably equal to the thickness $e_1$ of the first plane magnetic means. These second plane magnetic means may be formed by an assembly of thin magnetic laminations parallel to the record carrier SM and separated from each other by thin non-magnetic laminations, this assembly of thin magnetic and non-magnetic laminations not being shown in FIGS. 6, 7a, 7b, 8 and 9 in order to simplify the latter.

If L is the length of the magnetoresistance, $MRI_1$ and $MRI_2$, $\lambda_1 + \lambda_3$ is commonly much greater than L. More generally, the dimensions $\lambda_1$, $\lambda_2$, $\lambda_3$, $\lambda_4$, $e_1$ and $e_2$ are selected as a function of the applications sought for the magnetoresistance transducer $TMRI_1$. They vary in particular as a function of the radial and linear densities of the magnetic record carriers it is wished to read.

Preferably, the first and second plane magnetic means $MCH_{env1} - MCH_{env2}$ on the one hand and $MCH_{iv1} - MCH_{iv2}$ on the other hand, are produced from the same anisotropic magnetic material.

Figure 7A:
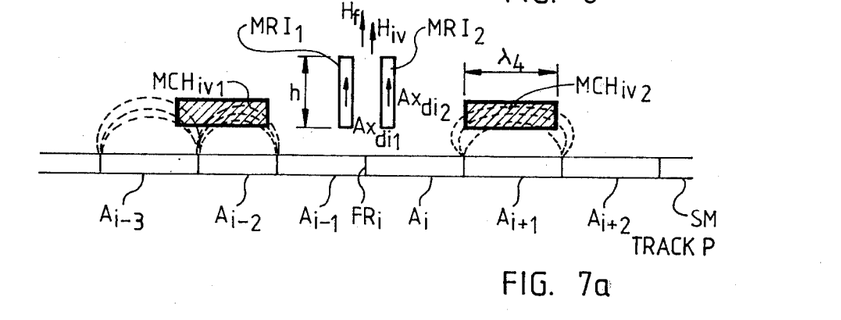
FIG. 7a is a view in cross-section of the same transducer in accordance with the present invention taken in a plane perpendicular to the record carrier and parallel to the direction of travel of the data.

As is apparent from FIG. 7a, the magnetic field lines (and thus the magnetic field itself) transmitted by the adjacent pairs of magnetic areas of opposite magnetic induction, being areas adjacent to the two magnetic areas $A_{i-1}$ and $A_i$ of which the boundary $FR_i$ has opposite it the two magnetoresistances $MRI_1$ and $MRI_2$, have their major proportion intercepted by the second plane magnetic means $MCH_{iv1}$ and $MCH_{iv2}$. The two magnetoresistances $MRI_1$ and $MRI_2$ are thus exposed in practice along their axes of difficult magnetization $Ax_{di1}$ and $Ax_{di2}$ to the component $H_f$ of the leakage field generated by the pair of magnetic areas $A_i$ and $A_{i-1}$, and only to this component. In effect, in view of the presence of the second plane magnetic means $MCH_{iv1}$ and $MCH_{iv2}$, the intensity $h_{iv}$ of the magnetic field originating from the magnetic areas adjacent to the areas $A_{i-1}$ and $A_i$, to which the two magnetoresistances are exposed, is very small as compared to $H_f$ and may be considered to be negligible.

Figure 7B:
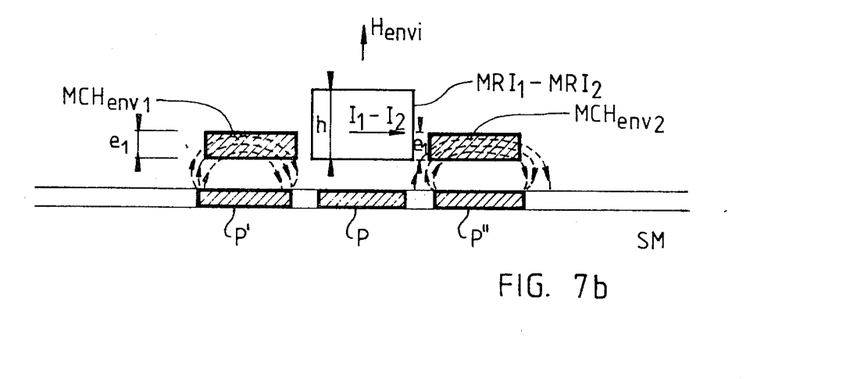

Similarly, it may be observed in FIG. 7b that the first plane magnetic means $MCH_{env1}$ and $MCH_{env2}$ intercept and deflect the greater proportion of the magnetic field lines transmitted by the immediate magnetic surroundings of the track P. The intensity $h_{envi}$ of the magnetic field originating from the immediate magnetic surroundings of the track P to which the two magnetoresistances are exposed is very low compared to the component $H_f$ and may be considered negligible.

It is apparent that the magnetoresistance transducer in accordance with the invention illustrated in FIGS. 6, 7a, 7b and 8 makes it possible to obtain a considerable reduction of the noise signal B caused by the magnetic leakage field transmitted by the immediate magnetic surroundings of the track P and on the other hand by the magnetic areas adjacent to the magnetic areas of which the boundary has the magnetoresistances opposite it at a given instant. This transducer according to the invention consequently has an S/B (signal/noise) ratio which is considerably improved compared to the prior art magnetoresistance transducer, and this although the linear and radial recording densities are very high.

The transducer TMRI illustrated in FIGS. 6b, 7a, 7b and 8 is preferably installed on an assembly of two electrically insulating substrates of non-magnetic material (such as glass) $SUBS_1$ and $SUBS_2$. These two substrates are joined together by a known production process such as glass welding described in French Patent No. 2315139 filed on June 19, 1975 by Compagnie Internationale pour L'Informatique under the title "New integrated magnetic head structures".

Figure 9:
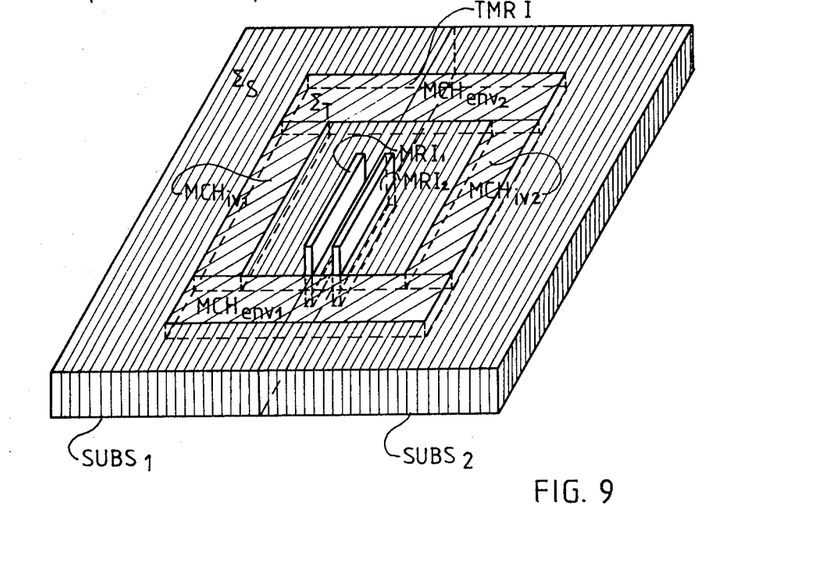
FIG. 9 shows the magnetoresistance transducer of FIG. 8, in three-quarter perspective and arranged on its substrate of insulating material.

The first and second plane magnetic means $MCH_{env1} - MCH_{env2}$ and $MCH_{iv1} - MCH_{iv2}$ are arranged in a recess formed within the substrates, in such a manner that the surfaces $\Sigma_S$ and $\Sigma_T$ of the substrates $SUBS_1$ and $SUBS_2$ on the one hand and of the transducer TMRI on the other hand, are situated in the same plane (see FIG. 9).

It is also evident that the transducer TMRI could be deposited on the surface $\Sigma_S$ of the two substrates $SUBS_1$ and $SUBS_2$, instead of being deposited within a recess formed in these substrates.

Figure 8:
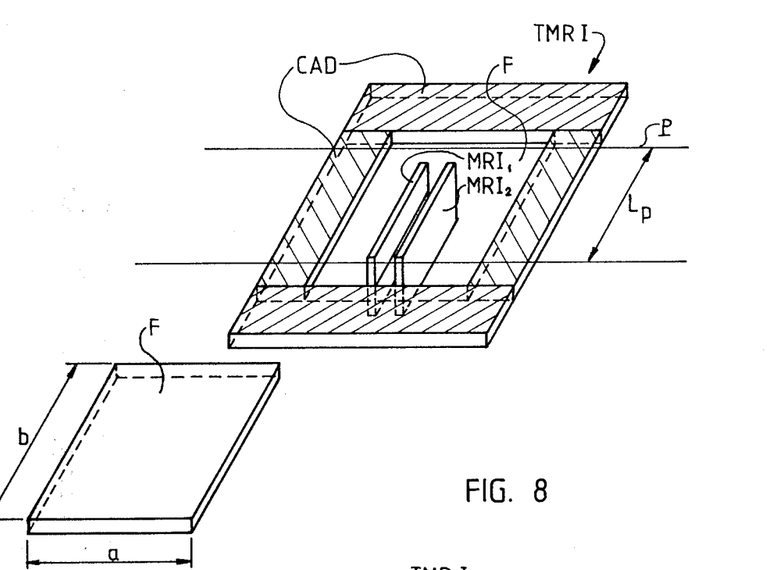
FIG. 8 is a three-quarter perspective view showing a magnetoresistance transducer in accordance with the present invention arranged opposite a track P of a magnetic disc.

As is clearly apparent by an examination of FIGS. 8 and 9, it may be stated that the first and second plane magnetic means form a frame CAD of homogenous structure of which the central part has formed in it an opening F. As a matter of fact, the first and second plane magnetic means have strictly identical structures, having the same magnetic material and the same system of a plurality of thin magnetic laminations between which are situated thin non-magnetic laminations, these laminations being parallel to the carrier SM. The dimensions of opening F are such that its length a measured parallel to the direction of travel of the data is substantially of the order of magnitude of twice the length of the elementary magnetic areas of the track P, and that its width b measured parallel to the length of the magnetoresistances is substantially equal to or a little greater than the track width Lp. It is apparent that the two magnetoresistances $MRI_1$ and $MRI_2$ are situated within this opening which thus forms a "read opening" of the magnetoresistance transducer TMRI. This makes it possible to read the data of the track P, data item by data item, with great accuracy.

We claim:

1. A magnetoresistance transducer for reading data present in a plurality of tracks of a multi track magnetic carrier comprising:
   at least one magnetoresistance ($MRI_1$, $MRI_2$) disposed perpendicular to the direction of travel of the data of each track (P) of the carrier, first and second plane magnetic means $MCH_{env1}$—$MCH_{env2}$, $MCH_{iv1}$—$MCH_{iv2}$) disposed parallel to the carrier and arranged respectively at opposite sides of the magnetoresistance, so that when the magnetoresistance is positioned opposite a given data item of the track (P) on the carrier the first means are situated opposite the immediate magnetic surroundings of the track (P) and the second means are situated opposite the data items of the track (P) and at either side of the given data item opposite which the magnetoresistance is situated.

2. A magnetoresistance transducer according to claim 1, wherein the first and second plane magnetic means comprises a frame (CAD), said frame having a central reading opening (F), the magnetoresistance being disposed within said central opening.

3. A magnetoresistance transducer according to claim 2, wherein the length a of the boundary of the opening (F) measured in a direction parallel to the direction of the travel of the data is of the order of magnitude of the length of two elementary magnetic areas of the track (P), the width b of the opening measured in a direction parallel to the length of the magnetoresistance is of the order of magnitude of the width $L_p$ of the track (P).

4. A magnetoresistance transducer according to any one of claims 1, or 2 or 3, wherein the first and second plane magnetic means consist of the same anisotropic magnetic material.

5. A magnetoresistance transducer according to any one of claims 1 or 2 or 3 wherein the thickness of the first and second plane magnetic means measured in a direction normal to the record carrier is much smaller than the length and width of these first and second means measured, respectively, in a direction parallel to the direction of travel of the data and a direction perpendicular to this direction of travel.

6. A magnetoresistance transducer according to any one of claims 1, 2 or 3 wherein the thickness of the first and second plane magnetic means is much smaller than the height h of the magnetoresistances measured in a direction normal to the record carrier.

7. A magnetoresistance transducer for reading data from a track (P) of a multi track magnetic carrier (SM) having a plurality of magnetic areas ($A_{i-2}$, $A_{i-1}$, $A_i$, $A_{i+1}$, $A_{i+2}$ . . . ) comprising first and second magnetoresistances ($MRI_1$ and $MRI_2$) disposed parallel to each other, first plane magnetic means $MCH_{env1}$ and $MCH_{env2}$ disposed at opposite sides of the magnetoresistances, so that they are positioned opposite the immediate magnetic surroundings of the track (P) of the carrier (SM) when the two magnetoresistances are disposed opposite the track (P), second plane magnetic means ($MCH_{iv1}$ and $MCH_{iv2}$) disposed at opposite sides of the magnetoresistances ($MRI_1$ and $MRI_2$) so that they are placed opposite adjacent magnetic ($A_{i-1}$ and A) of the track (P) when the two magnetoresistances $MRI_1$ and $MRI_2$ are placed opposite the boundary ($FR_i$) of the two areas ($A_{i-1}$ and $A_i$) said first and second plane magnetic means forming a frame surrounding said magnetoresistances.

8. A transducer as set forth in claim 7 wherein the second plane magnetic means comprises first and second regions of anisotropic magnetic material having lengths equal to to or greater than the width Lp of the track P of the carrier SM.

9. A transducer as set forth in claim 7 wherein the first plane magnetic means ($MCH_{env1}$ and $MCH_{env2}$) are identical and comprise a plurality of thin mutually parallel magnetic laminations separated from each other by thin non-magnetic laminations, the assembly of the magnetic and non-magnetic laminations being parallel to the record carrier from which data is to be read.

10. A transducer as set forth in claim 9 wherein the width $\lambda_1$ measured along a direction parallel to the length of the magnetoresistances of the first and second magnetic means is substantially of the order of magnitude of the width Lp of the tracks (P′, P″ and P) of the record carrier and the length $\lambda_2$ of the first plane magnetic means measured along a direction parallel to the direction of travel of the data is at least four times greater than the length of an elementary magetic area.

11. A transducer as set forth in claim 10 wherein the thickness $e_1$ of the first magnetic means is substantially smaller than the height h of the magnetoresistances measured at right angles to the carrier (SM), this thickness $e_1$ being much smaller than the two other dimensions $\lambda_1$ and $\lambda_2$ of the same first plane magentic means.

12. A transducer as set forth in claim 10 wherein the second plane magnetic means ($MCH_{iv1}$ and $MCH_{iv2}$) have a width $\lambda_3$ which, measured in the direction of the length of the magnetoresistances, is a little smaller than or equal to the width Lp of the tracks of the magnetic carrier (SM) and a length $\lambda_4$, measured along a direction parallel to the direction of travel of the data, in the order of or appreciably greater than the length of each elementary magnetic area of the track (P).

13. A transducer as set forth in claim 12 wherein the thickness $e_2$ of the second plane magnetic means is much smaller than the height h of the magnetoresistances and equally much smaller than the dimensions $\lambda_3$ and $\lambda_4$.

* * * * *

UNITED STATES PATENT AND TRADEMARK OFFICE
CERTIFICATE OF CORRECTION

PATENT NO. : 4,432,028
DATED : February 14, 1984
INVENTOR(S) : Jacques DESSERRE and Michel HELLE It is certified that error appears in the above-identified patent and that said Letters Patent are hereby corrected as shown below:

Column 14, line 13, delete "to", first occurence

Column 14, line 31, change "magetic" to --magnetic--

Signed and Sealed this

Twenty-seventh Day of November 1984

[SEAL]

Attest:

GERALD J. MOSSINGHOFF

Attesting Officer

Commissioner of Patents and Trademarks